(12) United States Patent
Bazenas et al.

(10) Patent No.: US 8,851,939 B2
(45) Date of Patent: Oct. 7, 2014

(54) SOLDER-LESS ELECTRICAL CONNECTION

(71) Applicant: Teledyne Instruments, Inc., Thousand Oaks, CA (US)

(72) Inventors: Mark A. Bazenas, DeLand, FL (US); Daniel J. Hawkins, Ormond Beach, FL (US); Chester P. Piechowiak, Ormond Beach, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 106 days.

(21) Appl. No.: 13/682,526

(22) Filed: Nov. 20, 2012

(65) Prior Publication Data

US 2014/0141658 A1 May 22, 2014

(51) Int. Cl.
| | |
|---|---|
| *H01R 13/33* | (2006.01) |
| *H01R 13/523* | (2006.01) |
| *H01R 13/187* | (2006.01) |
| *H01R 4/20* | (2006.01) |
| *H01R 13/11* | (2006.01) |
| *F16F 1/04* | (2006.01) |

(52) U.S. Cl.
CPC .............. *H01R 4/20* (2013.01); *H01R 13/523* (2013.01); *H01R 13/187* (2013.01); *H01R 13/111* (2013.01); *F16F 1/045* (2013.01)
USPC ............................... 439/840; 439/851

(58) Field of Classification Search
CPC .. H01R 13/052; H01R 13/111; H01R 13/113; H01R 13/187; H01R 13/2421
USPC ......... 439/730, 840, 841, 843, 846, 851, 852, 439/884
See application file for complete search history.

(56) References Cited

U.S. PATENT DOCUMENTS

| | | | |
|---|---|---|---|
| 4,447,105 A | 5/1984 | Ruehl | |
| 5,645,442 A | 7/1997 | Cairns | |
| 6,042,432 A * | 3/2000 | Hashizawa et al. | 439/843 |
| 6,250,974 B1 * | 6/2001 | Kerek | 439/843 |
| 6,520,998 B1 * | 2/2003 | Scholler et al. | 439/851 |
| 6,848,922 B2 * | 2/2005 | Coughlan et al. | 439/181 |
| 6,943,298 B2 | 9/2005 | Nicholson | |

(Continued)

FOREIGN PATENT DOCUMENTS

EP     2 387 113 A2     11/2011

OTHER PUBLICATIONS

International Search Report and Written Opinion for related PCT Application No. PCT/US2013/050112, mailed Sep. 17, 2013, in 14 pages.

*Primary Examiner* — Thanh Tam Le
(74) *Attorney, Agent, or Firm* — Procopio Cory Hargreaves & Savitch LLP (57) ABSTRACT

A solder-less wire connector sleeve of conductive material has a first bore portion extending from a first end and configured for rotatable connection to an end portion of an electrical rod or pin of a subsea connector or the like, and a second bore portion extending from the second end and configured for receiving a wire. The sleeve has a crimp portion overlying the wire receiving end portion. An annular, resilient, snap engaging member is mounted in the first bore portion to extend radially inwardly into the bore, and is configured for resilient, snap engagement in an annular groove in the conductor rod adjacent the tip of the rod to retain the rod in the sleeve while permitting relative rotation between the rod and sleeve.

14 Claims, 6 Drawing Sheets

(56) References Cited

U.S. PATENT DOCUMENTS

| | | |
|---|---|---|
| 7,055,812 B2 | 6/2006 | Balsells |
| 7,112,080 B2 | 9/2006 | Nicholson |
| 7,722,415 B2 | 5/2010 | Chansrivong |
| 7,955,145 B2 | 6/2011 | Chansrivong |
| 7,959,454 B2 | 6/2011 | Ramasubramanian et al. |
| 8,123,549 B2 | 2/2012 | Jazowski et al. |
| 8,282,429 B2 * | 10/2012 | Glick et al. .................. 439/843 |
| 8,342,893 B2 * | 1/2013 | Glick et al. .................. 439/840 |
| 8,382,533 B2 * | 2/2013 | Pavlovic et al. ............... 439/840 |
| 8,430,698 B2 * | 4/2013 | Stewart et al. ................ 439/843 |
| 8,579,666 B2 * | 11/2013 | Lampert et al. ............... 439/843 |
| 2002/0122690 A1 | 9/2002 | Poon et al. |
| 2008/0003851 A1 | 1/2008 | Ainceri et al. |
| 2010/0029145 A1 | 2/2010 | Balsells et al. |
| 2012/0003880 A1 | 1/2012 | Glick et al. |
| 2012/0003884 A1 * | 1/2012 | Lampert et al. ............... 439/884 |
| 2012/0208407 A1 | 8/2012 | Gordon et al. |

\* cited by examiner

SOLDER-LESS ELECTRICAL CONNECTION

BACKGROUND

1. Field of the Invention

The present invention relates to electrical wire connections and is particularly concerned with making electrical connections to conductor rods of a subsea electrical connector.

2. Related Art

There are many types of connectors for making electrical connections in hostile or harsh environments, such as underwater or subsea electrical and hybrid electrical and optical connectors which can be repeatedly mated and demated underwater at great ocean depths. These connectors typically consist of releasably mateable plug and receptacle units or connector parts, each attached to cables or other devices intended to be joined by the connectors to form completed circuits. Each electrical or hybrid connector unit contains one or more electrical contacts or junctions for engagement with the junctions in the other unit when the two units are mated together. To completely isolate the contacts to be joined from the ambient environment, one or both parts of these connectors house the contacts in oil-filled, pressure-balanced chambers. Some subsea electrical connectors are described in U.S. Pat. Nos. 5,645,442, 7,959,454, and 8,123,549 of Teledyne Instruments, Inc. Such connector units are provided at opposite ends of subsea electrical cables or twisted wire cables, which may be oil-filled, pressure compensated hoses. In assembling such hoses, cable is typically stripped to expose the wires, and the wires are then soldered into standard solder pots at the rear end of the connector unit, then covered with a boot seal. Electrical solder connections are also used in other subsea applications, such as subsea splice containers.

When soldering a wire connection, the joint becomes rigid as the solder cools. The joint, including solder that has wicked up the wire, is not flexible and develops a mechanically stressed weak point at the junction between the wire and the end of the conductor rod. As a result, wire breakage may occur during the assembly, distribution, installation or operation of subsea products. Additionally, the current soldering process includes use of lead based solder, and lead has been identified as a hazardous substance and future RoHS (Restriction of Hazardous Substances) compliance requirements may restrict its use in subsea applications.

Commercial off-the-shelf crimp connectors which do not require solder connection are not usable for connections to subsea electrical equipment or subsea connector units, because they are not designed for the proper gage of wire and they also would not fit on the conductor rods or pins of subsea connectors without modification to accommodate the required electrical load.

SUMMARY

Apparatus and methods for solder-less wire connections in subsea connectors or other subsea equipment are provided. In one aspect, a solder-less wire connector is provided, which comprises a sleeve of conductive material having opposite first and second ends, a first bore portion extending from a first end and configured for rotatable connection to an end portion of an electrical rod or pin of a subsea connector or the like, a second bore portion extending from the second end and configured for receiving a wire, the sleeve having a crimpable portion over part of the second bore portion spaced from the second end which is designed for crimped electrical connection with an exposed portion of an insulated wire extending into the second bore portion.

In one embodiment, the end portion of the electrical rod or pin has an annular groove spaced from the tip of the pin, and an annular, resilient, snap engaging member is mounted in the first bore portion to extend radially inwardly into the bore, and is configured for resilient, snap engagement in the annular pin groove to retain the pin in the sleeve while permitting relative rotation between the pin and sleeve. In one embodiment, the resilient snap engaging member may be a radial canted coil spring mounted in an annular groove in the first bore portion, providing both retention and electrical connection between the pin and the conductive sleeve while permitting relative rotation between the sleeve and pin for relieving radial stress.

The solder-less wire connection or joint has advantages over a non-flexible soldered connection which has a mechanically stressed weak point which may break as a result of radial stress and torqueing of wires attached to a subsea electrical connector or the like. The solder-less connector has the ability to rotate relative to the connector or other electrical equipment to which it is attached, and also provides axial stress relief since the canted coil spring acts as a stress reliever.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a solder-less electrical connector for connecting insulated wires at one end of a subsea cable to connector rods of subsea equipment such as subsea electrical or hybrid connectors or other equipment such as down-hole electrical submersible pumps (ESP) in an oil well.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
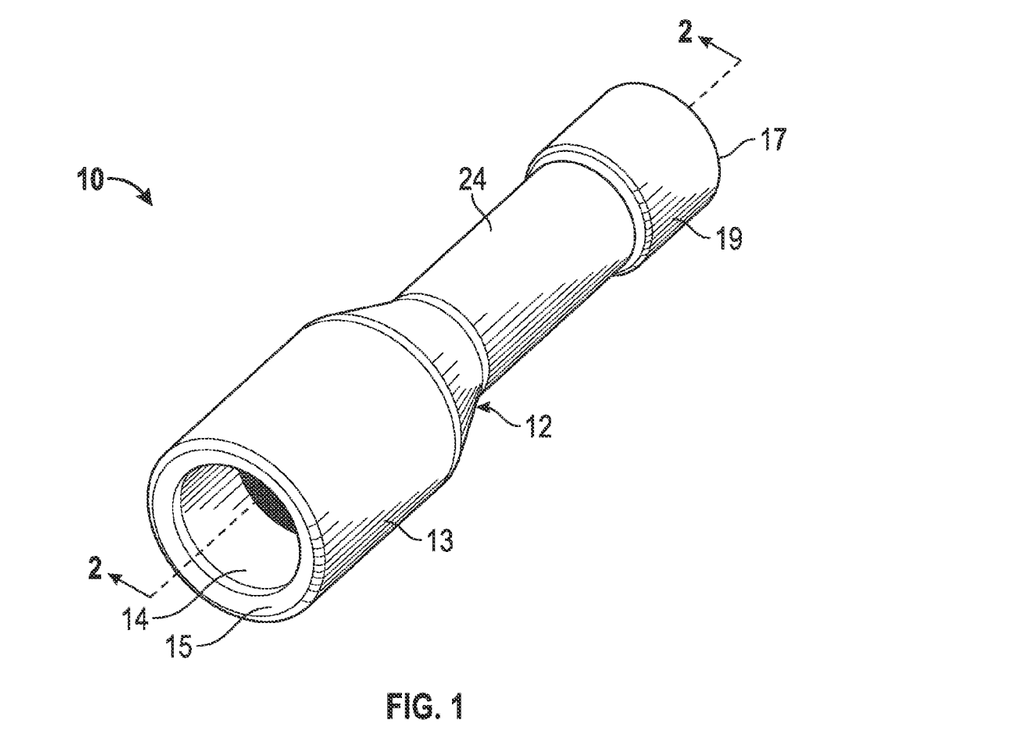
FIG. 1 is a perspective view of one embodiment of a solder-less electrical connector prior to connection to an exposed end of an insulated electrical wire.
Figure 2:
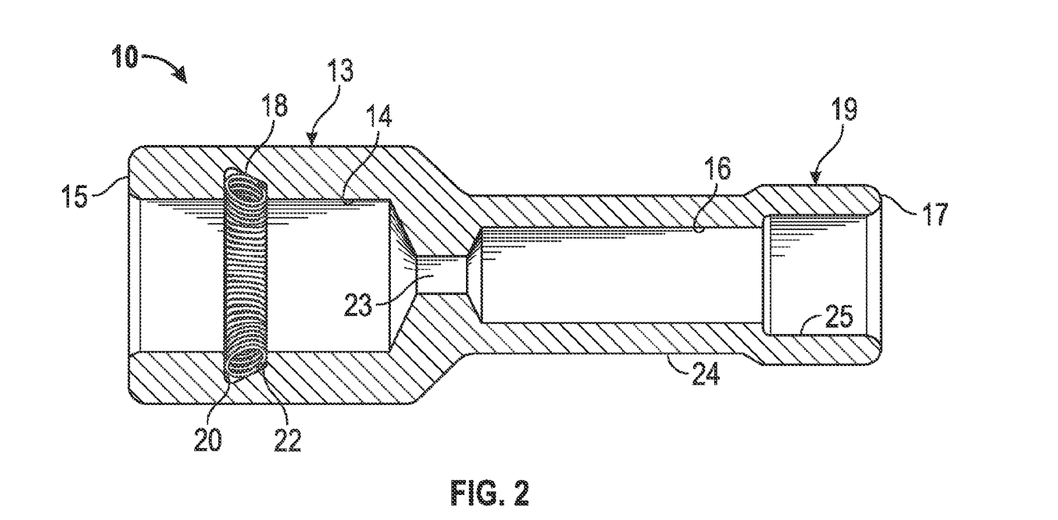
FIG. 2 is a cross sectional view of the solder-less electrical connector.
Figure 3:
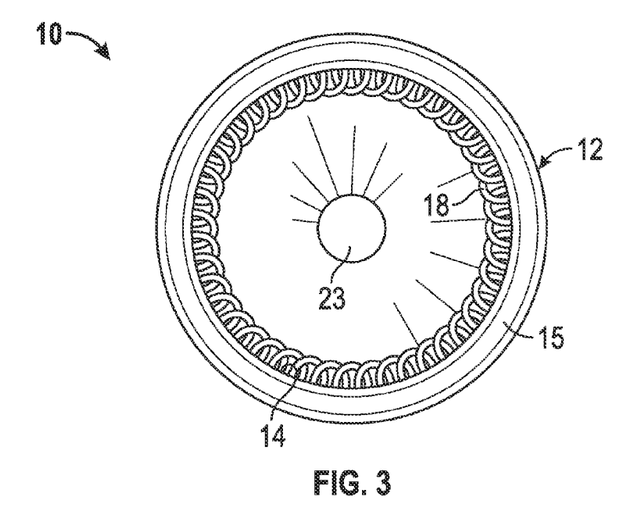
FIG. 3 is an end view of the conductor rod receiving end of the solder-less electrical connector.

FIGS. 1 to 3 illustrate a first embodiment of a solder-less electrical connector 10 for subsea use, prior to installation between a conductive connector rod of a subsea connector or the like and an exposed end of an insulated wire of a subsea cable. Connector 10 basically comprises a sleeve 12 of conductive material which has larger diameter end portions 13, 19 connected by smaller diameter portion 24. Larger diameter end portion 13 has a first bore portion 14 of a first, larger diameter extending from a first end 15 of the sleeve. A second bore portion 16 of smaller diameter extends through smaller diameter portion 24 of the sleeve, and a third bore portion or counterbore 25 of slightly larger diameter than portion 16 extends up to the second end 17 of the sleeve.

An annular, resilient conductive member 18 is mounted in an annular groove 20 in bore portion 14 with a portion of member 18 projecting into the bore, as seen in FIGS. 2 and 3. In one embodiment, the resilient conductive member comprises a canted coil spring and the inner end 22 of groove 20 may also be canted at the same angle as spring 18, as seen in FIG. 2. First and second bore portions 14 and 16 may be connected by a smaller diameter passageway 23, as illustrated in FIG. 2.

In one embodiment, a canted coil spring manufactured by Bal Seal Engineering, Inc. of Foothill Ranch, California was used for the resilient conductive member. Examples of such springs are described in US Pat. App. Pub. No. 2012/0208407 and U.S. Pat. Nos. 7,055,812 and 7,955,145 of Bal Seal Engineering, Inc., the contents of which are incorporated herein by reference. Although the inner end 22 of groove 20 is canted in the illustrated embodiment, the groove may have a flat bottom wall or inner end, a V-shaped bottom wall, or may be of other shapes in other embodiments, for example as described in US Pat. App. Pub. No. 2012/0208407. Different groove geometries and dimensions may be used with various spring designs, dimensions and materials to obtain the desired conductive path between a conductor pin and conductive sleeve 12, as described in more detail below in connection with FIG. 6.

Reduced diameter portion 24 of the sleeve 12 which surrounds the bore portion 16 is designed to be crimpable with a crimping tool to provide an electrical and mechanical connection to an exposed end portion of an insulated wire extending into bore portion 16. Counterbore 25 of larger diameter is designed to provide support to an insulated portion of the conductive wire, as illustrated in FIG. 6 and discussed in more detail below.

Figure 4:
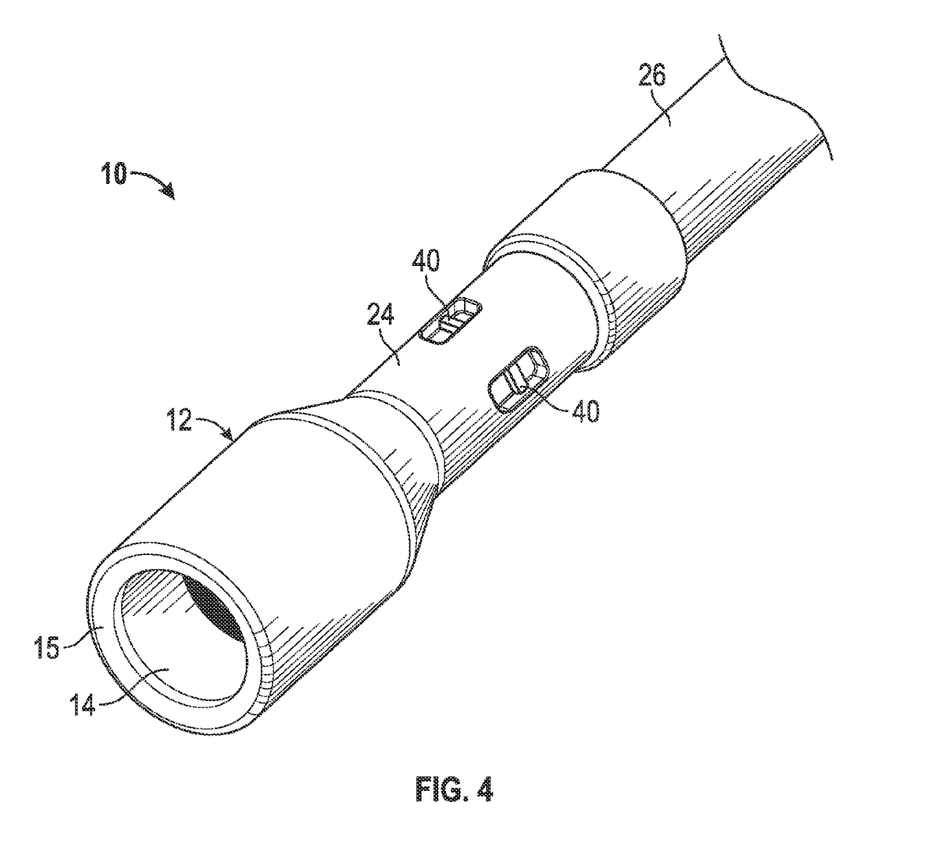
FIG. 4 is a perspective view of the solder-less electrical connector connected to an insulated electrical wire.
Figure 5:
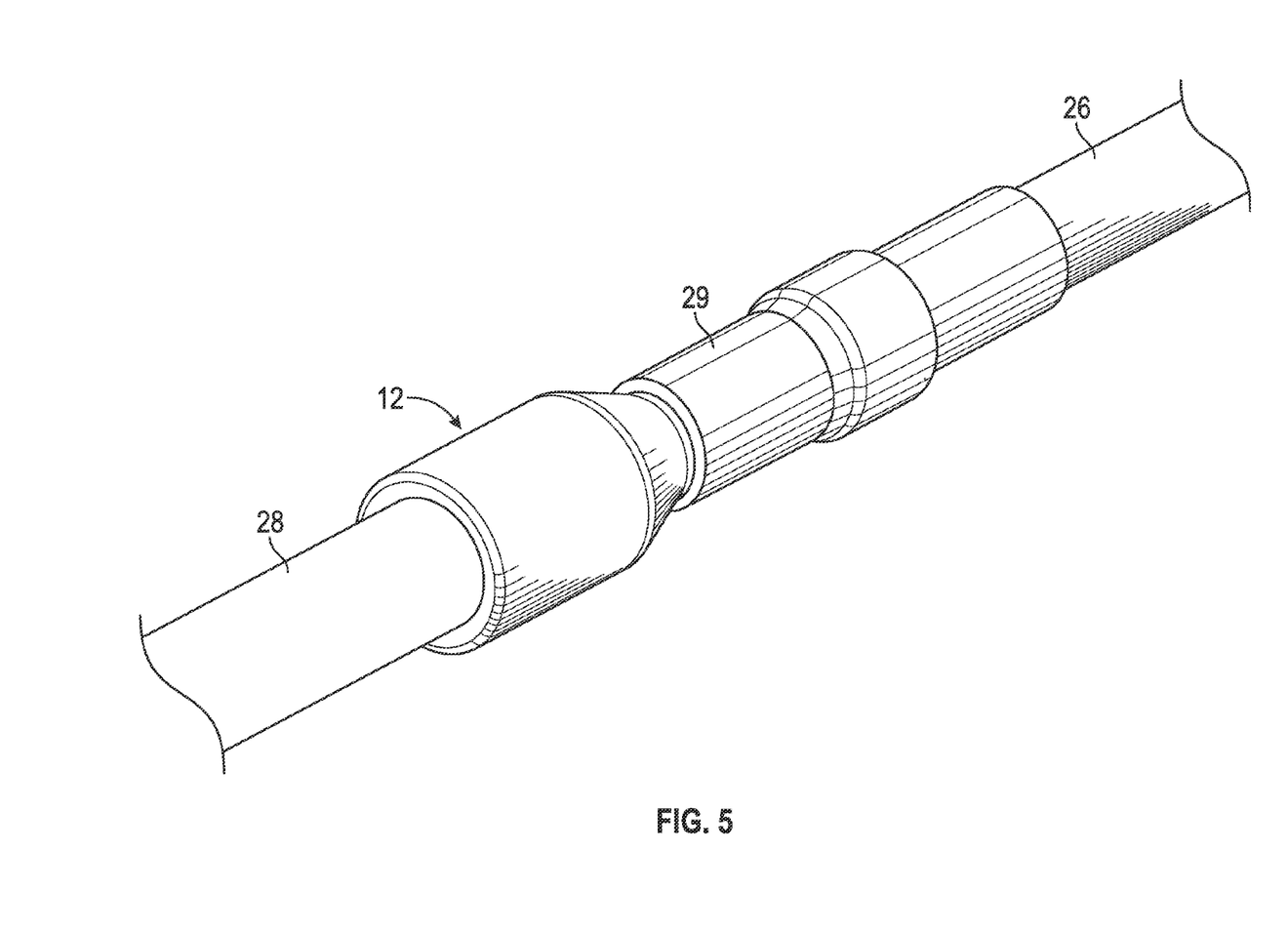
FIG. 5 is a perspective view similar to FIG. 4 but with a conductor rod connected to the opposite end of the solder-less electrical connector and with heat shrink wrap applied over the connected wire and part of the connector sleeve.

FIG. 4 illustrates the second end of connector sleeve 12 of FIGS. 1 to 3 secured to an insulated wire 26 of a subsea electrical or hybrid electro-optical cable, while FIG. 5 illustrates the resultant assembly with a conductor rod or pin 28 of a subsea electrical connector or the like secured to the first end of the sleeve 12. In FIG. 5, the second end portion of the sleeve containing the end of the insulated wire 26 is also covered with a suitable plastic heat shrink wrap 29 which extends over the end 17 of sleeve 12.

Figure 6:
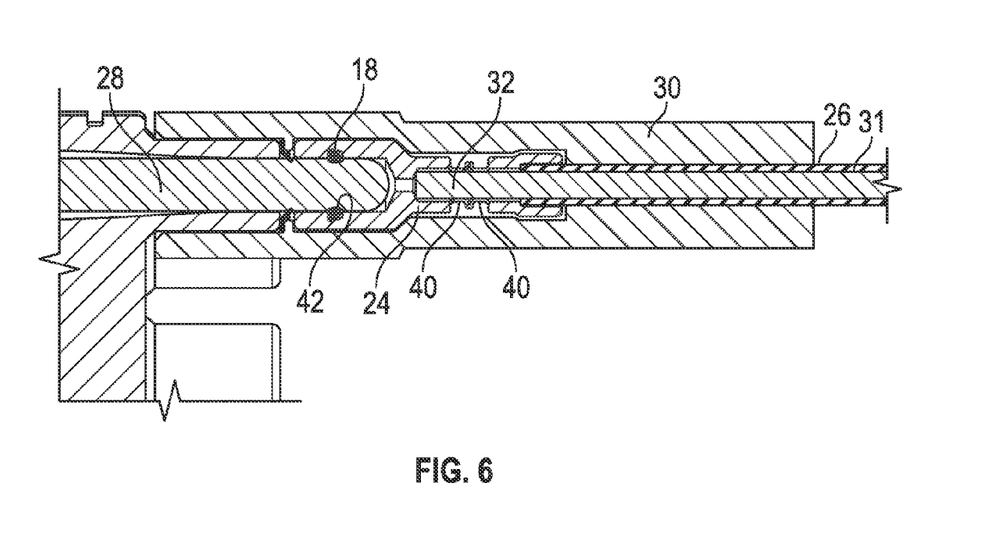
FIG. 6 is a cross sectional view of the solder-less electrical connector connected between a conductor rod or pin of a subsea connector unit or the like and an insulated electrical wire to form a solder-less electrical connection.

FIG. 6 is a cross-sectional view of the assembled connection with a boot seal 30 extending over sleeve 12, part of the insulated wire 26, and conductor rod 28. In order to attach insulated wire 26 to the connector sleeve 12, the insulation layer 31 is first stripped from an end portion 32 of the conductive wire 26, and the end portion 32 is then inserted into bore portion 16 until an end portion of the insulation layer 31 engages in counterbore 25, as illustrated in FIG. 6. Reduced diameter sleeve portion 24 is then crimped to form crimped regions 40 which are in gripping, electrical contact with exposed wire end portion 32, securing the wire end in the sleeve. Counterbore 25 provides additional support to the insulated wire by engaging insulation layer 31. This helps to eliminate a stress point typically encountered in soldered wire connections and to reduce the risk of a wire bending failure.

Figure 7:
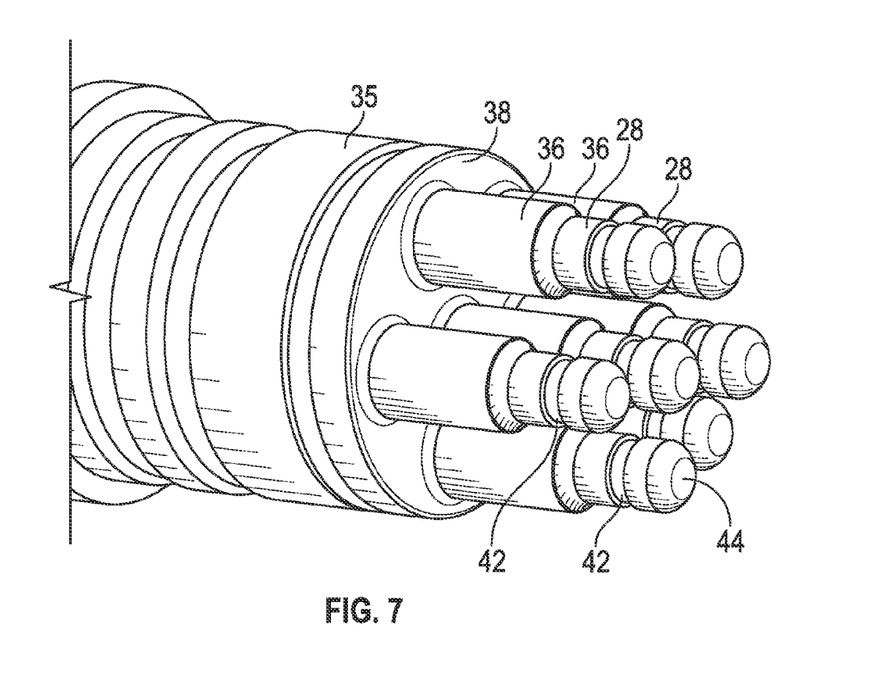
FIG. 7 is a perspective view of the end of a multi-pin subsea connector with the exposed ends of the conductor rods prior to connection to wires of an underwater cable.
Figure 8:
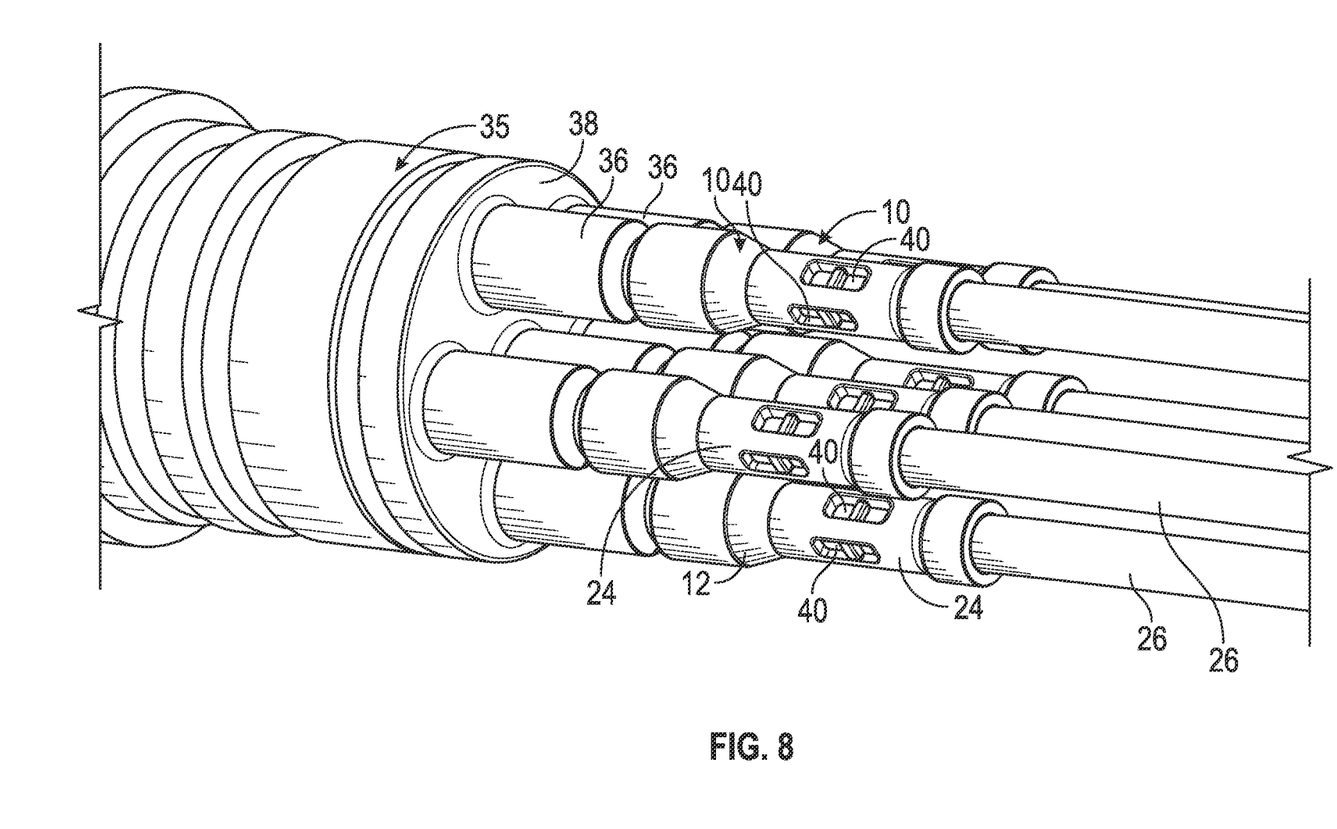
FIG. 8 is a perspective view similar to FIG. 7 but illustrating insulated wires connected to each conductor rod via a solder-less electrical connector as illustrated in FIGS. 1 to 6.

FIG. 7 illustrates the end of a multi-pin subsea connector 35 with the exposed end portions of the conductor rods or pins 28 extending from raised bosses 36 in connector end face 38 prior to connection to wires of an underwater cable using solder-less connectors 10, as in FIG. 8. FIG. 8 illustrates a plurality of insulated wires 26 connected to the projecting end portions of respective conductor rods 28 of connector 35 via respective solder-less connectors 10, prior to addition of shrink wrap around the crimped portions of connector sleeves 12. As illustrated in FIG. 7, the exposed end portion of each pin is modified for attachment in the first bore portion 14 of a respective connector sleeve 12 by forming an annular attachment groove or indent 42 in the pin at a location spaced from the tip 44 of the respective pin. In the illustrated embodiment, the inner end wall of the groove 42 is flat but it may be angled or of other shapes in alternative embodiments. When the end portion of a respective pin is engaged in bore portion 14 of a respective connector 10, the inwardly projecting portion of canted coil spring 18 is first compressed and then snaps into engagement with groove 42. The coil spring 18 is of conductive material and this engagement provides both electrical contact between the rod or pin 28 and conductive sleeve 12 and also mechanical connection strength to resist removal or separation of the pin from sleeve 12. At the same time, the connector sleeve 12 can rotate relative to the axially retained conductor pin, providing radial stress relief in the event of twisting of the attached conductor wires 26. The connection of FIG. 6 provides electrical communication between the exposed end portion 32 of wire 26 and the conductor rod 36 through conductive sleeve 12, which contacts wire end portion 32 via crimped regions 40 of sleeve portion 24 and is in electrical contact with conductor rod 36 via conductive spring 18 which is biased into engagement with the surfaces of groove 42. In other words, the combined depth of opposing annular grooves 20 and 42 is less than the unbiased thickness of canted coil spring 18 in a direction transverse to the central axis of the spring, but the biasing force does not prevent relative rotation between the sleeve 12 and retained conductor rod end portion 38.

As noted above, the conductive member in the illustrated embodiment is a canted coil spring 18 and the groove 20 which receives the spring has a canted inner or bottom wall 22. The relative dimensions of the groove and spring are selected so that the spring is in good electrical contact with the walls of the groove and is also biased into the groove 42 in pin 28 with sufficient force to resist separation of the pin from the sleeve. In one embodiment, the relative dimensions of groove 20 and spring 18 are such that the spring contacts at least the opposite side walls of the groove. Spring 18 may have a minor axis length greater than the width between the side walls of groove 20, so that it is compressed and retained between the side walls when inserted. The dimensions may be arranged such that the canted coil spring is retained by compression force ranging from between 2% to 35% of the maximum compression force. The spring and groove dimensions may be designed so that the spring contacts the opposite side walls and bottom wall of the groove when in the installed condition of FIG. 6. Alternatively, the dimensions of the spring and groove may be selected so that the spring contacts only the opposite side walls and is spaced from the bottom wall of the groove in the fully installed condition.

The opposite side walls are parallel to one another and may be orthogonal to the axis of spring 18 or may be angled in other embodiments. The inner end or bottom wall 22 is canted with a single slope in the illustrated embodiment, so that both side walls are non-orthogonal to the bottom wall. In other embodiments, the groove may have a V-shaped bottom wall, or may be flat and orthogonal to both side walls, and grooves of other shapes may be used in alternative embodiments.

The solder-less connector 10 described above can handle a wide range of conductive wire sizes and is rated for 30 A across wire sizes from 10-22 AWG (American wire gauge), as compared to current soldered connections which require solder pot expanders for larger wire sizes. The crimped portion of the connector exceeds the tensile separation force requirements defined in MIL-DTL-22520 and IPC/WHMA-A-620 Tensile Strength Requirements. In one embodiment, the separation force of the solder-less connection to the conductor rod 28 may be greater than the axial strength of the conductor wire. In other words, pull testing indicates that the wires 26 will break before the connector separates from the conductor rod.

Figure 9:
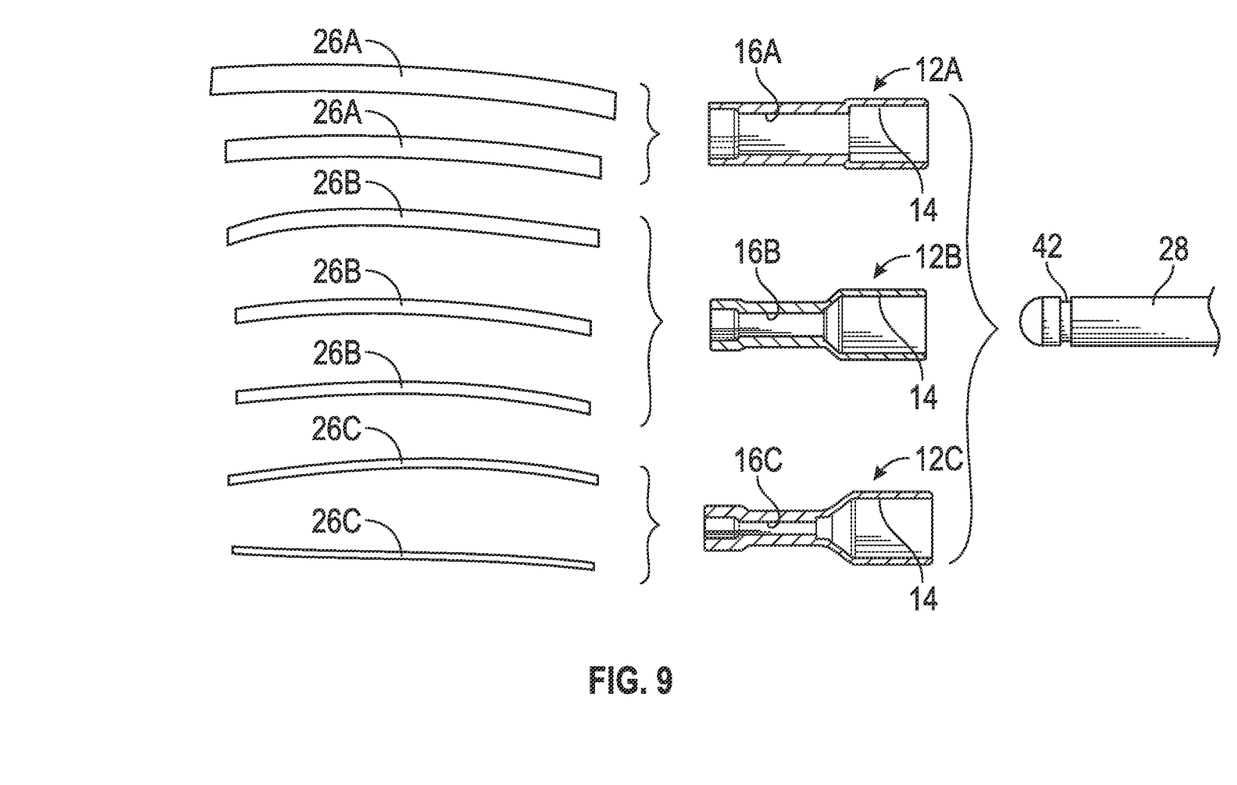
FIG. 9 illustrates a set of different size solder-less connectors usable to connect multiple different wire sizes directly to a conductor rod.

Solder-less connectors 10 may be provided in different sizes to accommodate different wire gauges. FIG. 9 illustrates three connector sleeves 12A, 12B, and 12C of different dimensions. Sleeves 12A, 12B and 12C have second bore portions 16A, 16B and 16C and counterbores 25A, 25B and 25C, respectively, of different diameters for connection to insulated wires of similar diameters. The first bore portions 14 of each sleeve in FIG. 9 are of identical diameters for connection to conductor rods 28 of uniform diameter, while the bore portions 16A, 16B and 16C are of different, decreasing diameters for receiving different ranges of standard gauge wires 26A to 26C. This design therefore allows multiple wire sizes to connect directly to subsea connector conductor rods without requiring soldered joints. This concept can be adapted into other subsea applications, such as subsea splice containers and high power subsea connectors.

The embodiments described above overcome several problems in current soldered wire connections to conductor rods of subsea connectors and other subsea equipment. When soldering a wire connection, the joint becomes rigid as the solder cools, developing a mechanically stressed weak point. This results in potential breakage during assembly, distribution, installation, or operation of subsea products, requiring expensive repair operations. Commercial, off-the-shelf crimp connectors are not suitable for replacing current soldered connections of wires to subsea conductor rods, because they cannot securely connect to existing conductor rods, and they also do not accommodate the range of wire gauges typically encountered in such applications. The solder-less subsea connector described above substantially reduces or overcomes these problems and offers a solder-less connection with electrical continuity, mechanical strength, axial and radial compliance over a broad range of conductor sizes.

The solder-less design eliminates the need to X-ray assemblies during production in order to satisfy customer requirements for void free solder joints. Such inspection processes which are currently used for soldered wire connections require use of an X-ray machine, digital images, as well as a machine operator and a soldering technician for any required re-work. The solder-less connector described above eliminates the need for this expensive and time consuming inspection and repair step during the manufacturing process.

Additionally, solder connections do not offer strain relief and support for the insulated wire. In the solder-less connection described above, the counter bore 25 engages the end of the insulation layer 31 surrounding the wire prior to the stripped end portion 32 of the wire, helping to eliminate a stress point and reducing the risk of a wire bending failure. Crimping the sleeve to the conductive wire is a robust, repeatable, and verifiable process with a higher degree of control and less dependency on operator skill than soldering to a conductive wire, reducing assembly and inspection times.

The connection of sleeve 12 to connector conductor rods is flexible in nature and allows for relative rotation between the conductor rod and sleeve, providing radial stress relief in the event of twisting or torqueing of wires. The canted coil spring engagement between the conductor rod and sleeve bore offers axial compliance and stress relief, with the spring acting as a shock absorber. The solder-less connector also assists in avoiding the use of lead based solder, which is a hazardous substance which may be excluded from subsea use in the future as a result of upcoming RoHS (Restriction of Hazardous Substances) compliance requirements.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A solder-less connector for connecting a wire of a subsea cable to a conductor rod of a subsea connector, comprising:

a sleeve of conductive material having opposite first and second ends;

the sleeve having a first bore portion extending from the first end and having a predetermined first internal diameter configured for rotatable connection to an end portion of a conductor rod of a subsea connector, and a second bore portion extending from the second end and configured for receiving a wire of a subsea cable;

the sleeve having a crimpable portion spaced from the second end and having a predetermined second internal diameter forming at least part of the second bore portion and configured for crimped mechanical and conductive solder-less connection to the wire;

the first bore portion having an annular groove spaced from the first end of the sleeve; and an annular resilient member of conductive material seated in the annular groove, the annular resilient member projecting radially into the first bore portion and configured for rotatable mating engagement with an annular indent in an exposed end portion of the conductor rod, whereby an attached conductor rod is axially secured in the second bore portion and the sleeve is rotatable relative to the conductor rod.

2. The solder-less connector of claim 1, wherein the annular resilient member comprises a coil spring having coils which are canted along a coil center line.

3. The solder-less connector of claim 2, wherein the annular groove has a canted inner end matching the canting of the canted coil spring.

4. The solder-less connector of claim 1, further comprising a passageway of reduced diameter between the first and second bore portions.

5. A solder-less connector for connecting a wire of a subsea cable to a conductor rod of a subsea connector, comprising:
   a sleeve of conductive material having opposite first and second ends;
   the sleeve having a first bore portion extending from the first end and having a predetermined first internal diameter configured for rotatable engagement with an end portion of a conductor rod of a subsea connector, and a second bore portion of stepped diameter extending from the second end and configured for receiving a wire of a subsea cable;
   the second bore portion having a counterbore of a first, larger diameter extending from the second end and an inner, crimpable portion of smaller diameter than the counterbore extending from the counterbore towards the first bore portion, the inner, crimpable portion having a predetermined wall thickness and internal diameter configured for crimped mechanical and conductive connection to the wire extending into the inner crimpable portion;
   the first bore portion having an annular groove spaced from the first end of the sleeve;
   an annular resilient member of conductive material seated in the annular groove, the annular resilient member projecting radially into the first bore portion and configured for rotatable mating engagement with an annular indent in an exposed end portion of the conductor rod, whereby an attached conductor rod is axially secured in the second bore portion and the sleeve is rotatable relative to the conductor rod; and
   the counterbore of the second bore portion being of predetermined internal diameter configured for engagement with an outer insulating layer of a conductive wire adjacent a stripped portion of the wire extending into the inner crimpable portion of the second bore portion of the sleeve.

6. The solder-less connector of claim 5, further comprising a plurality of sleeves having crimpable bore portions of different internal diameters configured for crimped mechanical and conductive connection to subsea cable wires of different predetermined gauge ranges, the sleeves having first bore portions of identical internal diameter.

7. A solder-less connection, comprising:
   a conductor rod having an end portion with a tip and an annular indent spaced from the tip;
   an insulated wire having a stripped end portion and at least one outer insulating layer covering the wire up to the stripped end portion;
   a sleeve of conductive material connecting the end portion of the conductor rod to the stripped end portion of the wire, the sleeve having a first end, a second end, a first bore portion extending inwardly from the first end and engaging over the end portion of the conductor rod, and a second bore portion extending inwardly from the second end and engaging over the stripped end portion of the conductive wire;
   an annular resilient member of conductive material mounted in the first bore portion and in rotatable mating engagement with the annular indent in the conductor rod end portion, whereby the sleeve is axially retained on the rod and rotatable relative to the rod; and
   a crimpable portion of the sleeve surrounding the stripped end portion of the wire having a first diameter and being crimped into conductive and mechanical gripping engagement with the wire.

8. The solder-less connection of claim 7, wherein the second bore portion has a counterbore at the second end of a second predetermined diameter larger than the first diameter extending from the second end, the second predetermined diameter substantially matching the outer diameter of the outer insulating layer of the insulated wire, and part of the insulated wire adjacent the stripped end portion extends into the counterbore with the insulating layer of the wire in engagement with the counterbore.

9. The solder-less connection of claim 7, wherein the annular resilient member comprises a canted coil spring.

10. The solder-less connection of claim 9, wherein the first bore portion has an annular groove and the canted coil spring is seated in the annular groove with part of the spring engaging in the annular indent on the conductor rod end portion.

11. The solder-less connection of claim 10, wherein the annular groove has a depth greater than the annular indent.

12. The solder-less connection of claim 10, wherein the annular groove has a canted inner end wall.

13. The solder-less connection of claim 12, wherein the annular indent has a non-canted inner end and is of uniform depth.

14. The solder-less connection of claim 10, wherein the canted coil spring has a central axis and a predetermined unbiased thickness in a direction transverse to the central axis, and the annular groove and annular indent have a combined depth less than the unbiased thickness of the canted coil spring.

* * * * *